United States Patent
Briddell et al.

(10) Patent No.: US 6,973,093 B1
(45) Date of Patent: Dec. 6, 2005

(54) SWITCHING FABRIC FOR INTERFACING A HOST PROCESSOR AND A PLURALITY OF NETWORK MODULES

(75) Inventors: Dennis M. Briddell, Cary, NC (US); Chirag Shroff, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 851 days.

(21) Appl. No.: 09/751,719

(22) Filed: Dec. 29, 2000

(51) Int. Cl.[7] ............................................. H04L 12/58
(52) U.S. Cl. ....................... 370/421; 370/423; 370/489
(58) Field of Search ................................. 370/421, 427; 352/223; 218/258; 219/384–39.5; 360/489, 360/216, 427–429; 729/212, 218, 219, 220, 729/224; 710/5, 306–310, 300, 315, 110, 710/108, 152, 311, 314, 100, 260, 219, 312; 379/90.01–93.07; 709/213, 216, 203; 348/143

(56) References Cited

U.S. PATENT DOCUMENTS

| | | | | |
|---|---|---|---|---|
| 5,590,292 A | * | 12/1996 | Wooten et al. | ................... 710/5 |
| 5,737,334 A | * | 4/1998 | Prince et al. | ........... 370/395.53 |
| 5,737,601 A | | 4/1998 | Jain et al. | |
| 5,806,075 A | | 9/1998 | Jain et al. | |
| 5,822,545 A | * | 10/1998 | So | ............................. 710/100 |
| 6,112,241 A | * | 8/2000 | Abdelnour et al. | ......... 709/224 |
| 6,115,374 A | * | 9/2000 | Stonebridge et al. | ........ 370/362 |
| 6,321,285 B1 | * | 11/2001 | Sheafor et al. | ............. 710/306 |
| 6,324,609 B1 | * | 11/2001 | Davis et al. | ................. 710/119 |
| 6,338,107 B1 | | 1/2002 | Neal et al. | |
| 6,400,682 B1 | * | 6/2002 | Regula | ...................... 370/223 |
| 6,446,149 B1 | * | 9/2002 | Moriarty et al. | ............ 710/110 |
| 6,477,139 B1 | * | 11/2002 | Anderson et al. | .......... 370/216 |
| 6,484,225 B2 | * | 11/2002 | Sheikh et al. | ............... 710/310 |
| 6,581,121 B1 | * | 6/2003 | Garcen et al. | .............. 710/300 |
| 6,742,066 B2 | * | 5/2004 | Emerson et al. | ............ 710/260 |
| 2001/0037311 A1 | | 11/2001 | McCoy et al. | |
| 2002/0032860 A1 | | 3/2002 | Wheeler et al. | |
| 2002/0091644 A1 | | 7/2002 | Wong et al. | |
| 2002/0143989 A1 | | 10/2002 | Huitema et al. | |
| 2003/0078969 A1 | | 4/2003 | Sprague et al. | |

* cited by examiner

*Primary Examiner*—Chi Pham
*Assistant Examiner*—Prenell Jones
(74) *Attorney, Agent, or Firm*—Baker Botts L.L.P.

(57) ABSTRACT

An information transport system includes a switching fabric that transfers information between network modules and between a host processor and the network modules. The switching fabric includes network module interfaces each associated with one or more network modules. The network module interfaces communicate with each other over a peer transaction bus to allow information to be transferred from one network module to another network module. The switching fabric also includes a processor interface associated with the host processor. The processor interface communicates with the network module interfaces over a host transaction bus to allow information transfer between the host processor and each network module. The peer transaction bus and the host transaction bus separately support routed packet data and peer to peer data transactions in order to prevent one type of transaction from blocking the other and avoid performance dependencies.

20 Claims, 3 Drawing Sheets

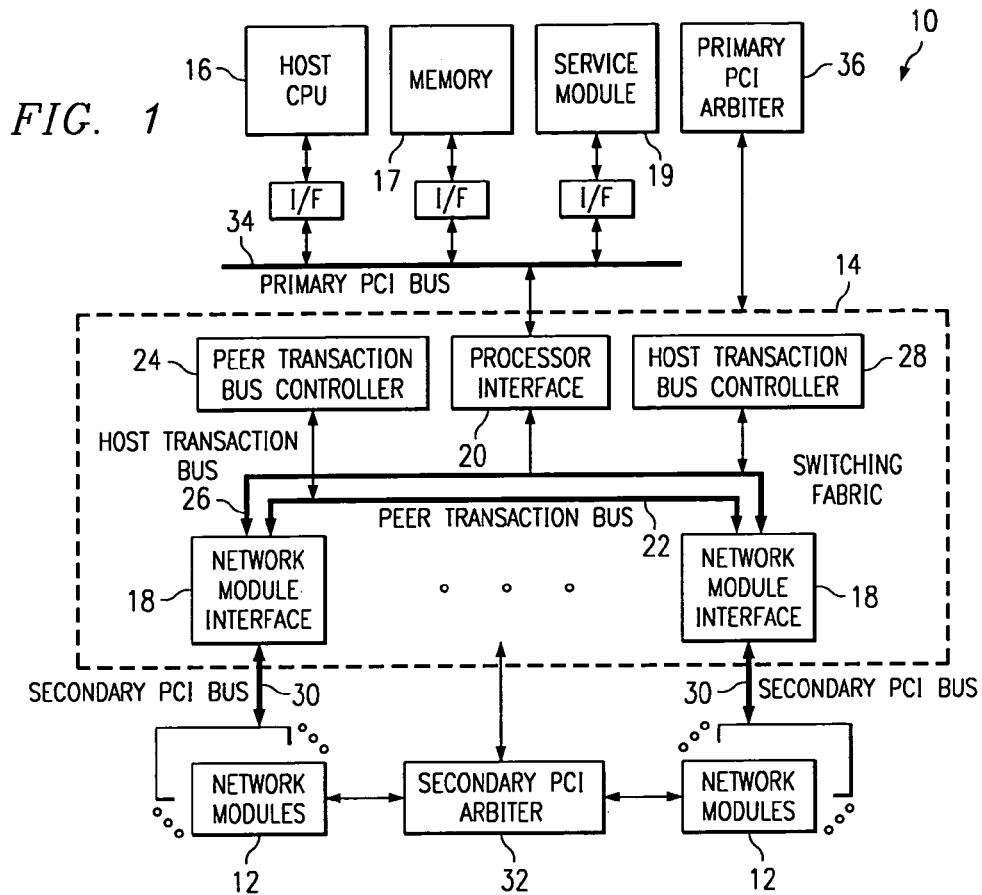

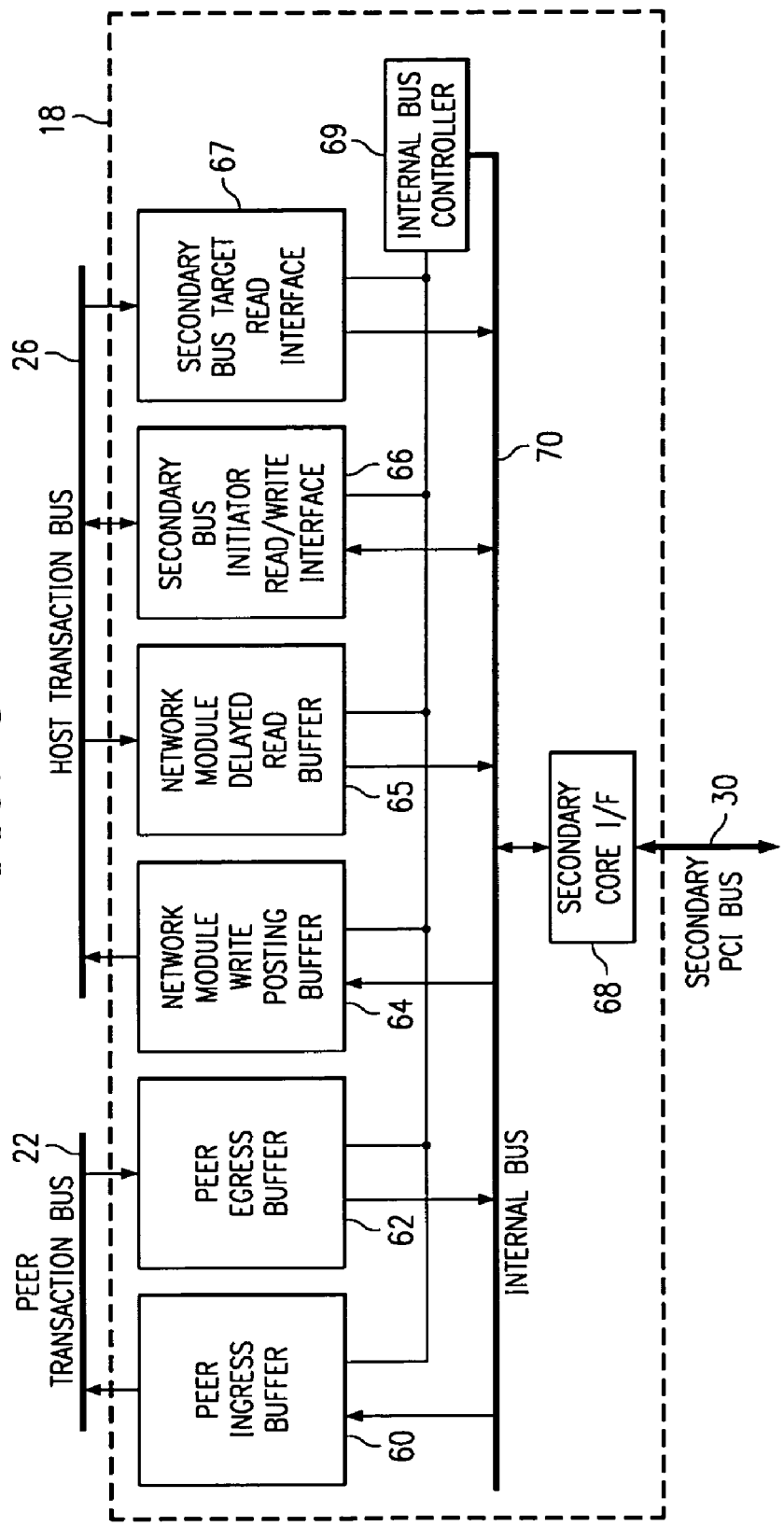

SWITCHING FABRIC FOR INTERFACING A HOST PROCESSOR AND A PLURALITY OF NETWORK MODULES

TECHNICAL FIELD OF THE INVENTION

The present invention relates in general to computer and telecommunications signal transport and more particularly to a switching fabric for interfacing a host processor and a plurality of network modules.

BACKGROUND OF THE INVENTION

Traditional routers are typically are layer three transport devices where all traffic sent from an interface is terminated by the router. The router extracts the packet data and provides it to a central processing unit for appropriate processing. After processing, the packet data is provided to the interface for egress transport. Asynchronous transfer mode transport, or layer two switching capability, has been identified as a market segment to include in the router environment for interface to interface communications, but asynchronous transfer mode transport cannot be effectively accomplished within a router over the layer three transport mechanism. Therefore, it is desirable to provide layer three and layer two transport capabilities within a router.

SUMMARY OF THE INVENTION

From the foregoing, it may be appreciated by those skilled in the art that a need has arisen for an interface that can handle layer 2 and layer 3 traffic transfer. In accordance with the present invention, a switching fabric for interfacing a host processor and a plurality of network modules is provided that substantially eliminates or greatly reduces disadvantages and problems associated with conventional information transfer techniques.

According to an embodiment of the present invention, there is provided a switching fabric for interfacing a host processor and a plurality of network modules that includes a plurality of network module interfaces. Each network module interface communicates with one or more associated network modules. The plurality of network modules also can communicate among one another over a peer transaction bus. The switching fabric also includes a processor interface to communicate with a host processor. The processor interface communicates with the plurality of network module interfaces over a host transaction bus. Each network module converts between the protocol of a communication link with an associated network module and the protocols of the peer and host transaction buses. The processor interfaces converts between the protocol of a communication link with the host processor and the protocol of the host transaction bus.

The present invention provides various technical advantages over conventional information transfer techniques. For example, one technical advantage is to transport two separate classes of data transactions, routed packet data and peer to peer transactions, over separate data paths within a single interface. Another technical advantage is to provide scalable and predictable performance for layer 3 traffic and layer 2 capabilities using a PCI based transport mechanism. Other technical advantages may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 1 illustrates a block diagram of an information transport system;

FIG. 2 illustrates a block diagram of a processor interface in the switching matrix of the information transport system;

FIG. 3 illustrates a block diagram of a network module interface in a switching fabric of the information transport system.

DETAILED DESCRIPTION OF THE INVENTION

Figure 4:
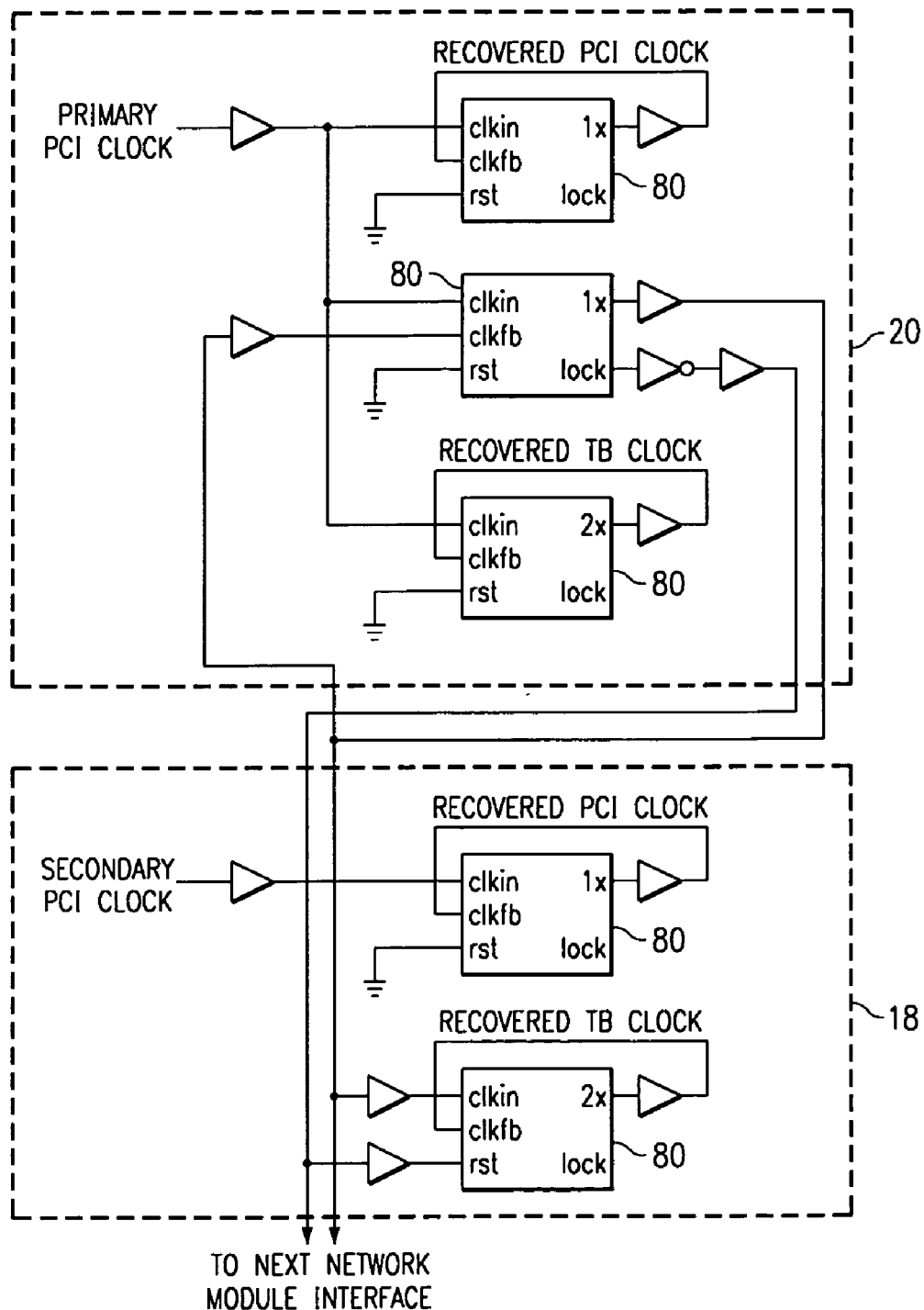
FIG. 4 illustrates a clock distribution scheme for the network module interfaces and the processor interface of the switching fabric.

FIG. 1 is a block diagram of an information transport system 10. Information transport system 10 includes a plurality of network modules 12, a switching fabric 14, a host processor 16, a memory 17, and other service modules 19. Switching fabric 14 includes a plurality of network module interfaces 18 and a processor interface 20. Network module interfaces 18 communicate with each other over a peer transaction bus 22 under the control of a peer transaction bus controller 24. Processor interface 20 communicates with each network module interface 18 over a host transaction bus 26 under the control of a host transaction bus controller 28. Each network module interface 18 communicates with one or more associated network modules 12.

In one embodiment, each network interface module 18 communicates with its associated network module 12 over a Peripheral Component Interconnect (PCI) bus, designated as a secondary PCI bus 30 under the control of a secondary PCI arbiter 32. Secondary PCI arbiter provides round robin arbitration among network modules 12 associated with a corresponding network module interface 18 with priority given to the corresponding network module interface 18. Each network module interface 18 has its own secondary PCI bus connection to its associated network modules 12. Processor interface 20 also has a PCI bus communication link with host processor 16 or its associated memory 17, designated as a primary PCI bus 34, under control of a primary PCI bus arbiter 36. Primary PCI bus arbiter 36 preferably performs round robin arbitration with priority given to host processor 16. Though described with respect to a PCI standard, the buses between network module interfaces 18 and network modules 12 and between processor interface 20 and host processor 16 may implement other conventional bus protocol techniques and may use the same or different protocol types.

Switching fabric 14 may transport two classes of data transactions. The first class of data transactions is routed packet data carried over host transaction bus 26. The first class of data transactions includes Layer 3 traffic between a network module 12 and host processor 16 carried over host transaction bus 26. The second class of data transactions is peer to peer transactions carried over peer transaction bus 22. The second class of data transactions includes Layer 2 traffic between individual network modules 12 carried over peer transaction bus 22. The two classes of data transactions are provided on separate data paths to prevent one type of transaction from blocking the other and to avoid performance dependencies.

For host transaction bus 26 operation, host processor 16 may initiate a transaction on primary PCI bus 34 which is decoded by processor interface 20 and placed on host transaction bus 26. An appropriate network module interface 18 claims the transaction and decodes it for placement on its secondary PCI bus 30 for use by an appropriate associated network module 12. The processor transaction may be completed as a PCI posted write or delayed read so that processor interface 20 is decoupled from the plurality of network module interfaces 18. In the opposite direction, a network module initiates a transaction on its secondary PCI bus 30 which is decoded by its associated network module interface 18 for placement onto host transaction bus 26. Processor interface 20 claims the transaction and decodes it for placement on primary PCI bus 34 for processing by host processor 16. The network module transaction may also be completed as a PCI posted write or delayed read.

For peer transaction bus 22 operation, data transfer may occur in two steps. The first step is where the network module 12 formats the data from one protocol, such as asynchronous transfer mode (ATM) cells, into a PCI write transaction. In the second step, the associated network module interface 18 decodes and switches the PCI write transaction to a destination network module 12 in a non-blocking fashion over peer transaction bus 22. Network module interface 18 decodes the address of the write transaction to determine its destination. If the decoded destination is to another network module 12 associated with a different network module interface 18, the write transaction is placed onto peer transaction bus 22. If the decoded destination is to a network module 12 associated with the same network module interface 18, then that network module interface 18 can route the transaction directly without using peer transaction bus 22. The network module interface 18 associated with the destination network module 12 decodes the write transaction received from peer transaction bus 22 back into a PCI format for transfer to the destination network module 12.

FIG. 2 is a block diagram of processor interface 20. Processor interface 20 includes a plurality of host delayed read buffers 50, a primary bus host target interface 52, a primary bus initiator write interface 54 and a processor interface core 56 coupled by an internal bus 55 controlled by an internal bus controller 57. The plurality of host delayed read buffers 50 allow concurrent PCI reads to be transacted from network modules 12. Preferably, each host delayed read buffer 50 is associated with a corresponding network module interface 18. Primary bus host target interface 52 services host PCI-memory, input/output, or configuration cycles originating from host processor 16. Primary bus initiator write interface 54 buffers data from memory write cycles originating from network module interfaces 18. Processor interface core 56 performs the conversion to and from primary PCI bus 34 according to primary PCI arbiter 36.

In operation, a host delayed read buffer 50 decodes a read cycle from host transaction bus 26 and latches an address obtained therefrom. The data associated with the decoded address is fetched from host processor 16 or its associated memory 17 through processor interface core 56 for temporary storage in host delayed read buffer 50. The data is transferred from host delayed read buffer 50 to an appropriate network module interface 18 over host transaction bus 26. For writing to host processor 16 or its associated memory, primary bus initiator write interface 54 decodes a write cycle, latches the decoded address, and receives posted write data. If primary bus initiator write interface 54 already contains data, then the write cycle will be retried. When primary bus initiator write interface 54 has posted write data, the posted write data is sent to host processor 16 or its associated memory 17 over primary PCI bus 34 through processor interface core 56.

Processor interface 20 supports both initiator and target cycles. Configuration registers within processor interface 20 are accessible by host processor 16 using PCI type 0 configuration cycles. Processor interface 20 also decodes type 1 configuration cycles. Type 1 configuration cycles may be forwarded to a secondary PCI bus 30 of an appropriate network module interface 18 over host transaction bus 26. The type 1 configuration cycle may be forwarded as a type 1 or type 0 configuration cycle to support additional levels of bridging at network modules 12.

FIG. 3 is a block diagram of a network module interface 18. Network module interface 18 includes a peer ingress buffer 60, a peer egress buffer 62, a network module write posting buffer 64, a network module delayed read buffer 65, a secondary bus initiator read/write interface 66, a secondary bus target read interface 67, a secondary core interface 68, and an internal bus controller 69. Peer ingress buffer 60 receives peer data from a network module 12 through secondary core interface 68 for transfer onto peer transaction bus 22. Peer egress buffer 62 receives peer data from peer transaction bus 22 for transfer to a network module 12 through secondary core interface 68. Network module write posting buffer 64 provides data for memory writes initiated by network modules 12 to primary bus initiator write interface 54 of processor interface 20 over host transaction bus 26. Network module delayed read buffer 65 receives data from host delayed read buffer 50 of processor 20 in response to a read request from a network module 12. Secondary bus initiator read/write interface 66 services host PCI memory or I/O reads, peer memory reads, and host PCI read/write configuration cycles. Secondary bus target read interface 67 handles peer PCI memory read cycles. Secondary core interface 68 performs the conversions between secondary PCI bus 30 and a bus 70 internal to network module interface 18. Bus controller 69 handles accesses to internal bus 70 of network module interface 18. An example type of bus technology used by internal bus 70 may include use of a PCI ADIO bus. Similar bus technology may be used for internal bus 70 and internal bus 55 of processor interface 20.

In operation, peer ingress buffer 60 receives and posts PCI write data onto peer transaction bus 22 upon determining that the destination address falls within the address range of network modules 12. Peer ingress buffer 60 accepts data if space is available and may be designed to queue a desired number of transfers. Peer ingress bus 60 requests access to peer transaction bus 22 when data has been stored therein. Peer egress buffer 62 receives data from a peer ingress buffer 60 either within the same network module interface 18 or from a remote network module interface 18 over peer transaction bus 22. Peer egress buffer 62 preferably accepts data unconditionally if space is available, otherwise the data is discarded. Once data has been received in peer egress buffer 62, it will be transferred to the appropriate network module 12.

Network module write posting buffer 64 captures host PCI memory write cycles originating from network modules 12. Address and data are then sent to primary bus initiator write interface 54 for processing. Further write cycles are retried until the contents of network module write posting buffer are transferred to the primary side. Network module delayed read buffer 65 captures host PCI memory read cycles originating from network modules 12 and latches the address and data received from the appropriate host delayed read buffer 50. Once a read cycle is latched, all other read cycles except for PCI read cycles to a peer network module 12 will be retried. Network module delayed read buffer 65 will continuously poll its corresponding host delayed read buffer 50 for data completion. Peer memory read cycles are handled by secondary bus target read interface 67. Secondary bus initiator read/write interface 66 posts its memory write cycles and handles its memory read cycles as a delayed transaction. Bus controller 69 preferably services all elements within network module interface 18 in a round robin fashion with priority given to peer egress buffer 62.

Host transaction bus 26 is preferably a shared synchronous bus for data transfer between various bus master and slave elements at processor interface 20 and network module interfaces 18. Bus masters include primary bus host target interface 52, network module write posting buffer 64, network module delayed read buffer 65, and secondary bus target read interface 67. Bus slaves include host delayed read buffers 50, primary bus initiator write interface 54, and secondary bus initiator read/write interface 66. Address information is placed on host transaction bus 26 for one clock cycle with the following clock cycles containing the data. Command and byte enable signals determine if a cycle is a read or write. A transaction start signal indicates a beginning of a cycle and preferably remains active for the duration of the transfer. A transaction acknowledge signal indicates that a bus slave can begin accepting data. A transaction retry signal allows a bus slave to signal that the destination is not ready to accept data and to inform the bus master to retry at a later time. A transaction error abort signal carried on host transaction bus 26 allows a bus slave to indicate that the destination is not available or experienced an error. Arbitration is preferably round robin with priority given to processor interface 20.

Peer transaction bus 22 is preferably a shared synchronous bus that transports unidirectional data movement between secondary core interfaces 68 within switching fabric 14. Data is sourced from a peer ingress buffer 60 and placed into a peer egress buffer 62 of a destination network module 12. Transfers on peer transaction bus 22 are connectionless. When data transfer begins, the bus master does not require acknowledgment from the bus slave that it is receiving data. Peer transaction bus 22 includes multiplexed address/data signals where the destination address is placed on peer transaction bus 22 for one clock cycle at the beginning of a data transfer, followed by an idle clock signal, followed by subsequent clock cycles containing the data. A transaction start signal indicates a beginning of a peer transaction bus 22 cycle and remains active for the duration of the transfer. Arbitration is preferably performed in a round robin fashion among the network module interfaces 18.

FIG. 4 shows a clock distribution scheme for processor interface 20 and network module interfaces 18. Processor interface 20 and network module interfaces 18 include digital lock loop devices 80 that are used to subtract out inter-chip delays and packaging effects so that the clock is de-skewed at the board level. In this manner, host transaction bus 26 and peer transaction bus 22 clock is in phase on all elements of switching fabric 14. The clock for host transaction bus 26 and peer transaction bus 22 is common to both busses and derived from the primary PCI bus clock. The clock is distributed as a 1× multiple of the primary PCI bus clock but internally multiplied to twice the input frequency. By deriving the clock for host transaction bus 26 and peer transaction bus 22 from the primary PCI bus clock, primary and secondary PCI busses may operate at different rates as desired.

Thus, it is apparent that there has been provided, in accordance with the present invention, a switching fabric for interfacing a host processor and a plurality of network modules that satisfies the advantages set forth above. Although the present invention has been described in detail, it should be understood that various changes, substitutions, and alterations may be readily ascertainable by those skilled in the art and may be made herein without departing from the spirit and scope of the present invention as defined by the following claims.

What is claimed is:

1. A switching fabric for interfacing a host processor and a plurality of network modules, comprising:
   a plurality of network module interfaces, each network module interface operable to communicate with one or more associated network modules over a module communication link, the plurality of network modules operable to communicate among one another over a peer transaction bus interconnecting the plurality of network module interfaces;
   a processor interface operable to communicate with a host processor over a host communication link, the processor interface operable to communicate with the plurality of network module interfaces over a host transaction bus, the peer transaction bus being separate from the host transaction bus to prevent transactions from blocking other transactions on either of the peer transaction bus and the host transaction bus and avoid performance dependencies therein.

2. The switching fabric of claim 1, wherein the module communication link which each of the plurality of network module interfaces communicates with its associated network modules is a Peripheral Component Interconnect (PCI) bus.

3. The switching fabric of claim 2, wherein each of the plurality of network module interfaces is operable to convert between a protocol of the PCI bus and protocols of the peer transaction bus and the host transaction bus.

4. The switching fabric of claim 1, wherein the host communication link which the processor interface communicates with the host processor is a Peripheral Component Interconnect (PCI) bus.

5. The switching fabric of claim 4, wherein the processor interface is operable to convert between a protocol of the PCI bus and a protocol of the host transaction bus.

6. The switching fabric of claim 1, further comprising:
   a peer transaction bus controller operable to control information transfer across the peer transaction bus;
   a host transaction bus controller operable to control information transfer across the host transaction bus.

7. A switching fabric for interfacing a host processor and a plurality of network modules, comprising:
   a plurality of network module interfaces, each network module interface operable to communicate with one or more associated network modules over a module communication link, the plurality of network modules operable to communicate among one another over a peer transaction bus;
   a processor interface operable to communicate with a host processor over a host communication link, the processor interface operable to communicate with the plurality of network module interfaces over a host transaction bus;
   wherein each of the plurality of network module interfaces includes:
      a network module interface core operable to convert between a protocol of the module communication link between each of the plurality of network module interfaces and their respective network modules and protocols of the peer transaction bus and the host transaction bus;

a peer ingress buffer operable to receive information from an associated network module for transfer onto the peer transaction bus;

a peer egress buffer operable to receive information from a remote network module over the peer transaction bus for transfer to an appropriate associated network module;

a network module write posting buffer operable to receive communications from an associated network module destined for the host processor for transfer onto the host transaction bus;

a network module delayed read buffer operable to receive information from the host processor over the host transaction bus for transfer to an appropriate associated network module.

8. A switching fabric for interfacing a host processor and a plurality of network modules, comprising:

a plurality of network module interfaces, each network module interface operable to communicate with one or more associated network modules over a module communication link, the plurality of network modules operable to communicate among one another over a peer transaction bus;

a processor interface operable to communicate with a host processor over a host communication link, the processor interface operable to communicate with the plurality of network module interfaces over a host transaction bus;

wherein the processor interface includes:

a processor interface core operable to convert between a protocol of the host communication link between the host processor and the processor interface and a protocol of the host transaction bus;

a host delayed read buffer operable to receive information from the host processor for transfer to a network module over the host transaction bus;

a processor initiator write buffer operable to receive information over the host transaction bus from a network module for transfer to the host processor.

9. A switching fabric for interfacing a host processor and a plurality of network modules, comprising:

a plurality of network module interfaces, each network module interface operable to communicate with one or more associated network modules over a module communication link, the plurality of network modules operable to communicate among one another over a peer transaction bus;

a processor interface operable to communicate with a host processor over a host communication link, the processor interface operable to communicate with the plurality of network module interfaces over a host transaction bus;

wherein a clock driving the host transaction bus and the peer transaction bus is derived from a clock driving the host communication link.

10. The switching fabric of claim 1, wherein the host communication link and the module communication links operate at different clock frequencies.

11. A switching fabric for interfacing a host processor and a plurality of network modules, comprising:

a plurality of network module interfaces, each network module interface operable to communicate with one or more associated network modules over a module communication link, the plurality of network modules operable to communicate among one another over a peer transaction bus;

a processor interface operable to communicate with a host processor over a host communication link, the processor interface operable to communicate with the plurality of network module interfaces over a host transaction bus;

wherein the peer transaction bus carries layer two traffic and the host transaction bus carries layer three traffic.

12. The switching fabric of claim 11, wherein the layer two traffic is in asynchronous transfer mode cells.

13. A method for interfacing a host processor and a plurality of network modules, comprising:

providing a module communication link between a network module interface and associated network modules;

providing a peer transaction path between a plurality of the network module interfaces to allow communications between non-associated network modules;

providing a host communication link between a processor interface and a host processor;

providing a host transaction path between the processor interface and the plurality of network module interfaces to allow communications between the host processor and all network modules, the peer transaction path being separate from the host transaction path to prevent transactions from blocking other transactions on either of the peer transaction bus and the host transaction bus and avoid performance dependencies therein.

14. The method of claim 13, further comprising:

sending information between the host processor and the processor interface using a Peripheral Component Interface (PCI) bus protocol.

15. The method of claim 14, further comprising:

converting the PCI bus protocol to and from a protocol of the host transaction path.

16. The method of claim 15, further comprising:

converting the protocol of the host transaction path to and from a protocol of the module communication link.

17. The method of claim 16, wherein the protocol of the module communication link is the PCI bus protocol.

18. The method of claim 13, further comprising:

sending information between a network module and its associated network module interface using a Peripheral Component Interface (PCI) bus protocol.

19. The method of claim 18, further comprising:

converting the PCI bus protocol to and from a protocol of the peer transaction path.

20. A switching fabric for interfacing a host processor and a plurality of network modules, comprising:

means for providing communications with one or more associated network modules over a module communication link; means for providing communications among non-associated network modules;

means for providing communications with a host processor over a host communication link;

means for providing communications between the host processor and all network modules, wherein non-associated network module communications are maintained separately from host processor to and from network module communications to prevent transactions from blocking other transactions associated with either the non-associated network module communications and the host processor to and from network module communications and avoid performance dependencies therein.

* * * * *